United States Patent [19]
Farabee et al.

[11] Patent Number: 5,654,531
[45] Date of Patent: Aug. 5, 1997

[54] REDUNDANT MULTIDROP COMMUNICATION SYSTEM FOR ELEVATORS

[75] Inventors: Larry A. Farabee; Michael J. Leeson, both of Memphis, Tenn.

[73] Assignee: Delaware Capital Formation, Inc., Wilmington, Del.

[21] Appl. No.: 511,833

[22] Filed: Aug. 7, 1995

[51] Int. Cl.[6] ............................ B66B 1/28; H04J 1/16
[52] U.S. Cl. ....................... 187/247; 187/391; 370/228
[58] Field of Search ................... 370/16, 16.1; 187/247, 187/248, 391, 393, 380

[56] References Cited

U.S. PATENT DOCUMENTS

| | | | |
|---|---|---|---|
| 4,308,935 | 1/1982 | Deric | 187/380 |
| 4,964,120 | 10/1990 | Mostashari | 370/16 |
| 5,200,949 | 4/1993 | Kobayashi | 370/16 |
| 5,202,540 | 4/1993 | Auer et al. | 187/101 |
| 5,329,521 | 7/1994 | Walsh et al. | 370/16 |
| 5,387,769 | 2/1995 | Kupersmith et al. | 187/248 |
| 5,457,689 | 10/1995 | Marvit et al. | 370/85.8 |
| 5,548,639 | 8/1996 | Ogura et al. | 379/221 |
| 5,551,532 | 9/1996 | Kupersmith | 187/391 |

*Primary Examiner*—Robert Nappi
*Attorney, Agent, or Firm*—White & Case

[57] ABSTRACT

An elevator system comprises a plurality of cars, and a group controller. A pair of multidrop communication links are connected with the cars such that, absent a communication break, a datagram transmitted by any car controller onto either link may be received by any or all of the remaining car controllers. Each car controller includes means for designating a primary link for each of the remaining cars, and means for rebroadcasting datagrams intended for another car on the primary link only when the datagram is received on a link other than the primary link.

Preferably, each controller includes a means to determine when communications with another car, over the primary link, have been disrupted, and to switch the designation of primary link accordingly. In the preferred embodiment, a timer means is associated with each car, which is reset each time the car receives a datagram originating from that car. If the timer expires, and subsequently the car receives a datagram from such car over another link, it resets the primary link.

The group controller may be a separate component of the system, but preferably all the car controllers have group controller software.

8 Claims, 7 Drawing Sheets

REDUNDANT MULTIDROP COMMUNICATION SYSTEM FOR ELEVATORS

FIELD OF INVENTION

The present invention relates to multi-car elevator systems having a group control.

BACKGROUND OF THE INVENTION

Historically, multi-car elevator control systems have used a separate controller to handle dispatching of hall calls to individual cars. Information is exchanged between cars and the group controller over serial communication links, using any number of communications methodologies, such as asynchronous or synchronous data transfer, and either full duplex or half-duplex communications lines. Should the communications link between the controller and any individual car be lost, the car could enter an automatic dispatching mode which would allow hall calls to continue to be serviced. Thus, the group controller would re-assign hall calls to another car with which the group controller still has contact. The car which lost contact with the group could enter an emergency dispatching mode of operation where it would answer all hall calls. The group controller also provided an ideal access point for elevator performance monitoring equipment because the group controller was the central receiving point for information relating the operations of all the cars in the group, and because the group controller was rarely taken out of service for maintenance or troubleshooting in comparison to individual cars.

Advancements in microprocessor technology allow the group control function to be integrated into each car controller. In such systems, each car controller is assigned a priority within the group, and the car with the highest priority controls the group function. Such a system is desirable because it eliminates the need for a separate group controller, reducing the cost of the elevator control system, and because it provides a built-in redundancy, each car controller being capable of assuming group control operations in the event of a failure of the group function in the primary car controller.

Whether there is a separate group controller or group control is performed within one of the car controllers, a failure on the serial communications line between cars can interfere with, or cause a loss of, group function. If one or more cars are cut off from the primary group controller, elevator operation will be degraded, because the group controller has fewer cars available to which it can assign incoming hall calls.

A communications failure also prevents elevator performance monitoring equipment from communicating with car controllers upstream of the failure point.

Additionally, in the case of systems in which each car has a group control capability, the stranded car, or one of the stranded cars (if more than one is cut off from the primary group controller), will assume the group function. As a result, when a hall call is generated, two cars (one assigned by the primary group controller and one from the stranded group of cars) will end up chasing the same hall call. This further degrades group operation and wastes energy.

SUMMARY OF THE INVENTION

The present invention relates to an elevator system which includes a plurality of cars and a group controller. Each car has a car controller including means for receiving and transmitting datagrams for effecting group operation. The datagrams specify the destination car, and preferably also identify the car that originated the datagram.

A pair of multidrop communication links are connected with the cars such that, absent a communication break, a datagram transmitted by any car controller onto either link may be received by any or all of the remaining car controllers. Each car controller includes means for designating a primary link for each of the remaining cars, and means for rebroadcasting datagrams intended for another car on the primary link only when the datagram is received on a link other than the primary link.

Also, each car controller includes a means to create datagrams and to transmit such datagrams, in normal operation, over only the primary link to the destination car.

Preferably, each controller includes a means to determine when communications with another car over the primary link have been disrupted, and to switch the designation of the primary link accordingly. In the preferred embodiment, the controller has a node timer associated with each of the other cars, which is reset each time a datagram originating from the respective car is received. If the timer value falls below a predetermined threshold, and subsequently the car receives a datagram from such car over another link, the controller resets the primary link associated with that car.

The group controller may be a separate component of the system, but preferably all the car controllers have group controller software.

The present invention thus uses a redundant communication link between each car in the system. However, rather than merely being a redundant system, each car controller automatically detects failed links and routes datagrams onto the remaining functional link. As a result, the system not only can tolerate multiple failures, but unlike a simple redundant link can tolerate failures on both links simultaneously, as long as at least one route remains available between each pair of adjacently connected cars. The chances of a group communication failure are thus substantially reduced, allowing the system to operate at peak efficiency.

Even with multiple communications links available, datagrams normally are sent only over one link, thus reducing the overhead of processing the same data twice. Under normal conditions, the routing algorithm allows only one communications link to be used to communicate between car controllers, and switches over to the other link only when necessary.

Each car controller detects all links at run time and requires no configuration. Physical wiring can be changed during operation without degrading group operation.

The elevator control system can run either in redundant or non-redundant configurations, which means that, if for a given job installation a redundant link is not required, the system does not need to be reconfigured. For example, where a separate group controller is used, the risk of a car losing communications with the group may be relatively small, such that the cost of running redundant wiring is not justified. In the present invention, if a redundant link is not present, the software of each node operates the same as if the redundant link were present, but a break has occurred on that link. This may also be applied to elevator monitoring where redundancy may or may not be required.

Due to the use of a multidrop configuration, where each car or other device is assigned a specified address, new devices such as elevator performance monitoring equipment may be added to the network without disrupting existing car-to-car communications. Also, loss of power to a car controller does not cause disruption to existing network communications. At worst, a new car would need to become master of the communications link and arbitrate who controls the link at any given time. This would occur automatically when the master of the link failed or lost power.

The multi-drop configuration allows a datagram to be sent directly to any other car controller, or to all of the other car controllers simultaneously, without requiring that the datagram be re-transmitted from car-to-car.

For a better understanding of the invention, reference is made to the following detailed description of a preferred embodiment, taken in conjunction with the drawings accompanying the application.

DETAILED DESCRIPTION OF A PREFERRED EMBODIMENT

Figure 1:
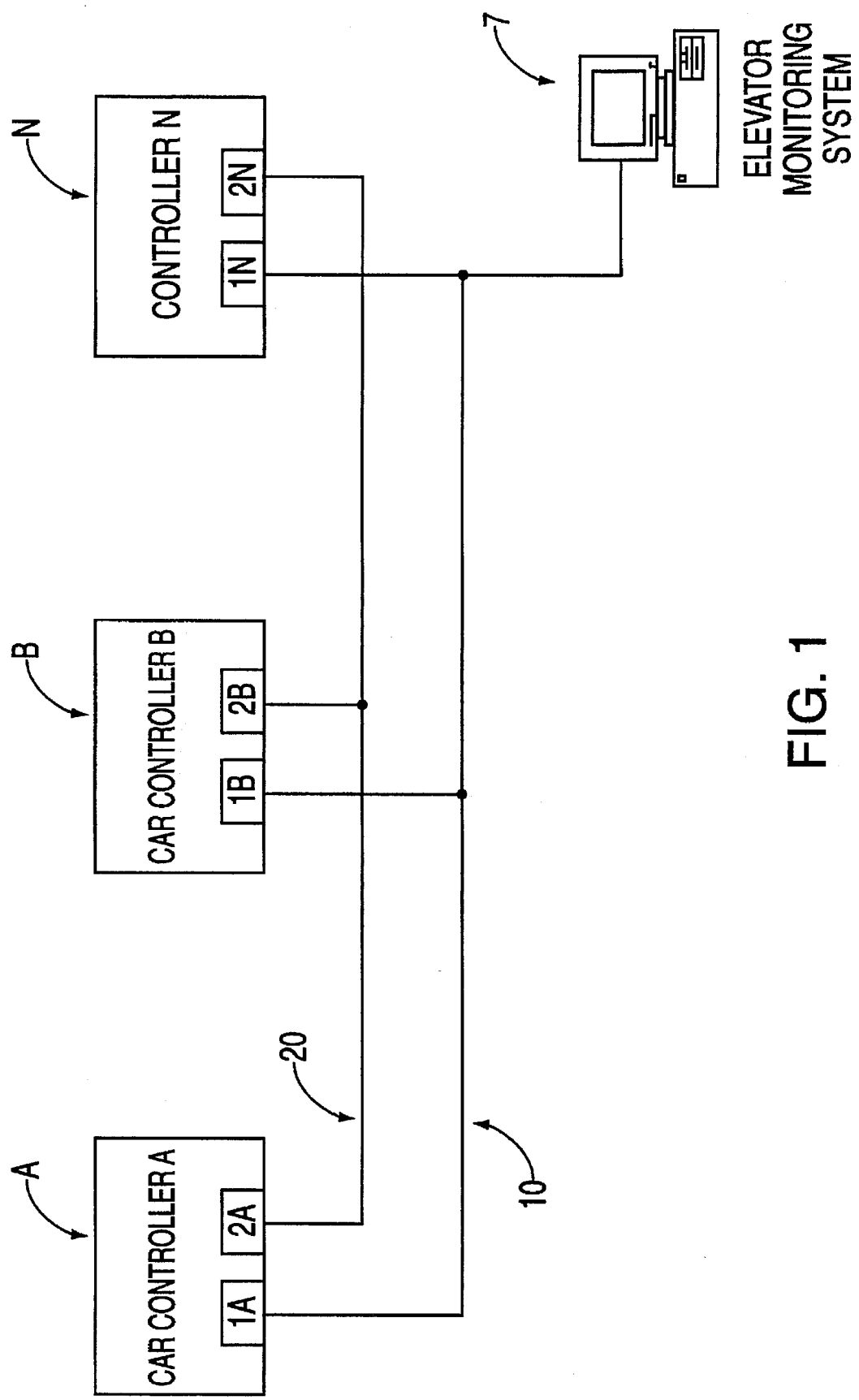
FIG. 1 is a block diagram of a multi-car elevator system according to the invention.

An elevator system according to the invention includes a plurality of elevator cars, designated A through N in FIG. 1, each having a car controller. "N" can represent any number of elevator cars greater than two (2).

Each car A–N includes a pair of serial communications ports 1A, 2A, 1B, 2B . . . 1N, 2N, for connecting the controller to a first 10 and second 20 communications link.

Each car controller includes car control software, for operating the individual car, and group communications routing software for receiving datagrams from, and sending datagrams to, other cars. Preferably, each car controller also includes group control software for assigning hall calls to cars in the group, however, a separate group controller can be used.

Among the car control functions are controlling the movement and direction of the car when responding to car calls or to assigned hall calls, initiating the opening and closing of the doors, and monitoring the safeties. Microprocessor-based car controllers are well known, and any suitable car controller may be used in connection with the present invention.

The group control software assigns cars to respond to incoming hall calls based, for example, on the instantaneous positions of the various cars in the hoistway. Assignment of cars may be based on other factors as well, such as the speed and direction of travel of the car and car calls entered by passengers already in the car. The group control software may also perform other car dispatching functions, such as dispatching idle cars to certain floors at certain times of the day based on known traffic patterns. Algorithms for performing group function, which generally seek to minimize the total travel times between floors, are well known, and any suitable group control software may be used herein.

Where each car controller includes group control software, the system contains means such that only one controller is used for group control at a time. This may be done using a known technique in which each car in the group is assigned a priority, and the car with the highest priority operating at any given time assumes group control.

In order to perform group function, it is necessary for various cars in the group to transmit information (such as speed, position, direction of movement, and registered car calls) to the group controller at regular intervals, and for the group controller to transmit information assigning hall calls to the various cars. In accordance with the present invention, a pair of communication links 10, 20 are used to transmit datagrams between cars.

Each link 10, 20 is preferably a multi-drop, half-duplex (i.e., each node does not receive and transmit datagrams simultaneously) synchronous communications channel using a token bus type algorithm to determine which car controller is allowed to transmit on the link. Datagrams can be routed using either link.

Token bus-type algorithms are known. In the preferred embodiment of this invention, the system can handle up to 255 nodes. Because all nodes are connected together on the multidrop network, and only one can talk at a time, one node serves as master of the link and gives the other nodes control of the link by polling them one at a time to allow each to send a message.

At power-up, each node will initially have no knowledge of what other nodes are present, and each node could potentially serve as master of the network. Thus, at power-up, each node starts a timer that is based on its physical address (the lower the address number, the shorter the time). If the timer of a given node expires without being polled by another node, it assumes that it is the highest priority node. Thus, if the car with the physical address "1", e.g., Car A, is operational, its timer should expire first. Car A will then assume control of the link and first poll itself to send a datagram. It will transmit the datagram first to node 2, e.g., Car B (not knowing whether Car B is present or active), relinquishing control of the link to Car B. As it does so, Car A starts a timer and awaits a datagram from Car B.

Car B, if present, receives the datagram and responds by returning a datagram addressed to Car A and returning control of the link to Car A. If Car B is not present, Car A's timer eventually times out, and Car A re-assumes control of the link. In either case, after control of the link has been returned to Car A, it polls node 3 in the same manner. This process continues until Car A has polled all 255 nodes.

Car A's controller maintains a list of the active nodes and polls each one as part of every token rotation. Also, during each token rotation, the controller polls an inactive node to determine if it has been powered up or been added to the network. If at any time a higher priority node becomes active on the link, the node which is currently acting as master relinquishes control of communications to the higher priority node.

Although each car controller could simply transmit datagrams over both communications links 10 and 20, one link acting as a backup in case of a communications failure on the other link, in accordance with the present invention each datagram is, in normal operation, transmitted from the source onto only a single communications link 10 or 20. Moreover, in the event of a break in the primary link, each car controller has means to transfer the datagram onto the other link. Furthermore, in the event of multiple breaks in the links, the car controllers have software to establish a transmission path between all cars in the group, provided that at least one path remains.

Each car controller on the network, which can be referred to as a "Node", has a unique logical address (a "NODE ID"), ranging from 1–255. This allows the value to be stored as an 8-bit hexadecimal number "xy", which cuts down on datagram overhead. In the NODE ID "xy", "x" is the group number (1–15 decimal, meaning that, because it occupies 4-bits, can take on 15 numerical values) and "y" is the car number (1–15 decimal). The monitoring system, if present, is also assigned an address.

Preferably, each I/O port 1A, 2A, 1B, 2B, 1N, 2N is assigned a physical address, which is also an 8-bit number. In addition, one physical address (e.g., 255) is selected as a broadcast address, which will be accepted by all the cars on the network.

Each car controller is capable of creating datagrams, and the routing software is capable of re-transmitting datagrams that are addressed to it but which are intended ultimately for some other car in the group. In order to perform these functions, each controller maintains a Routing Table, as shown below:

Routing Table

| Car or "NODE ID" | Link ID | Physical Node Address | Node Timer |
| --- | --- | --- | --- |
| 0 | | Unused | |
| 1 | L10 | P1 | T1 |
| 2 | L10 | P2 | T2 |
| 3 | L10 | P3 | T3 |
| . | . | . | . |
| . | . | . | . |
| . | . | . | . |
| 255 | L10 | P255 | T255 |

The "Link ID" defines which communications link, 10 or 20, is to be used as the primary communications link for the corresponding Node ID. In other words, if car #2's Routing Table indicates "L10" for Node ID 1, that indicates that car #2 expects to communicate with car #1 over link 10 rather than link 20.

The "Node Timer" is an 8-bit counter that tracks the time interval between successive datagrams arriving from a given Node. When a datagram is received on the primary link from a given node, the Node Timer for that node is reset and begins a countdown. The initial timer value is selected so that, in normal operation, successive datagrams will arrive before the timer expires. The Node Timer information is maintained independently by each node for all the other nodes in the network and the initial value is universally known through the software system.

Figure 2:
FIG. 2 is a block representation of a communications datagram for exchanging information between the cars of FIG. 1.

In order to communicate between cars, the car controllers prepare datagrams. An example of a datagram that may be used in the invention is shown in FIG. 2, and includes two data fields, the destination NODE ID, and the source NODE ID. Such a datagram may be used in a system employing architecture which is modeled on ISO IS 7498 Open System Interconnection (OSI) reference model.

In the exemplary embodiment, Data Field 1 contains the destination physical address (i.e., the serial port, e.g., "1A", to which the datagram is to be transmitted), the physical address of the transmitting node, and the type of datagram (such as data only, master polling a slave, slave returning control to the master, etc.).

The destination NODE ID identifies the car (node) for whom the datagram is ultimately intended. As explained further on, a datagram intended for a given destination node may need to be routed first through an intermediate node. Thus, if a datagram intended for Car D needs to be routed through Car B, the destination NODE ID will specify Car D, but the destination physical address (which specifies where the datagram will be sent) will specify one of the ports (1B or 2B) associated with Car B. The source NODE ID identifies the car (node) that generated the datagram.

Finally, Data Field 2 can contain process data (e.g., assignment of hall calls or information regarding car position, speed, and direction, and unanswered car calls). Such fields may contain information similar to datagrams currently in use, such as Dover Model TIII and TIV traction elevators, and need not be described further here.

The routing software in each car performs two major functions independently of the other car controllers in the network: (1) build the Routing Table; and (2) route datagrams to the appropriate communications link.

When a datagram is to be transmitted, the Routing Table is used. The controller provides the destination Node ID. The NODE ID is used as an index into the Routing Table to determine the physical address to which the datagram should be sent and the link onto which the datagram should be transmitted. The physical address of the source node and the destination physical address are included in the datagram, along with the destination Node ID and source Node ID.

If the Routing Table does not contain Link ID or physical address data for the destination node, the datagram is assigned a broadcast physical address, e.g., 255, meaning that it will be addressed to all the nodes, and is transmitted onto all the links 10 and 20.

Figure 3:
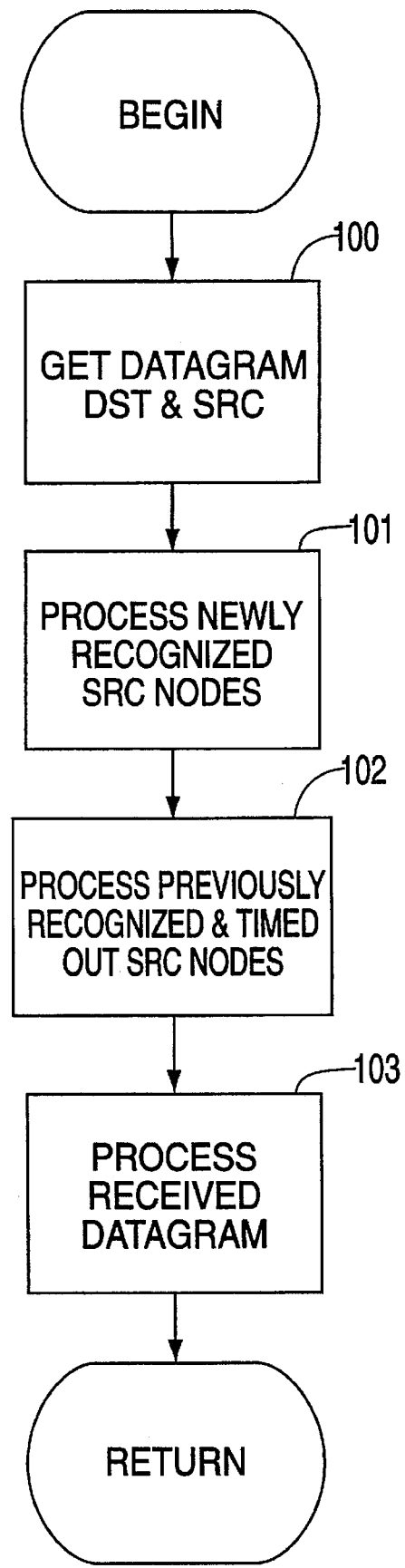
FIG. 3 is a flow chart setting forth an algorithm used by car controllers for processing datagrams.
Figure 4:
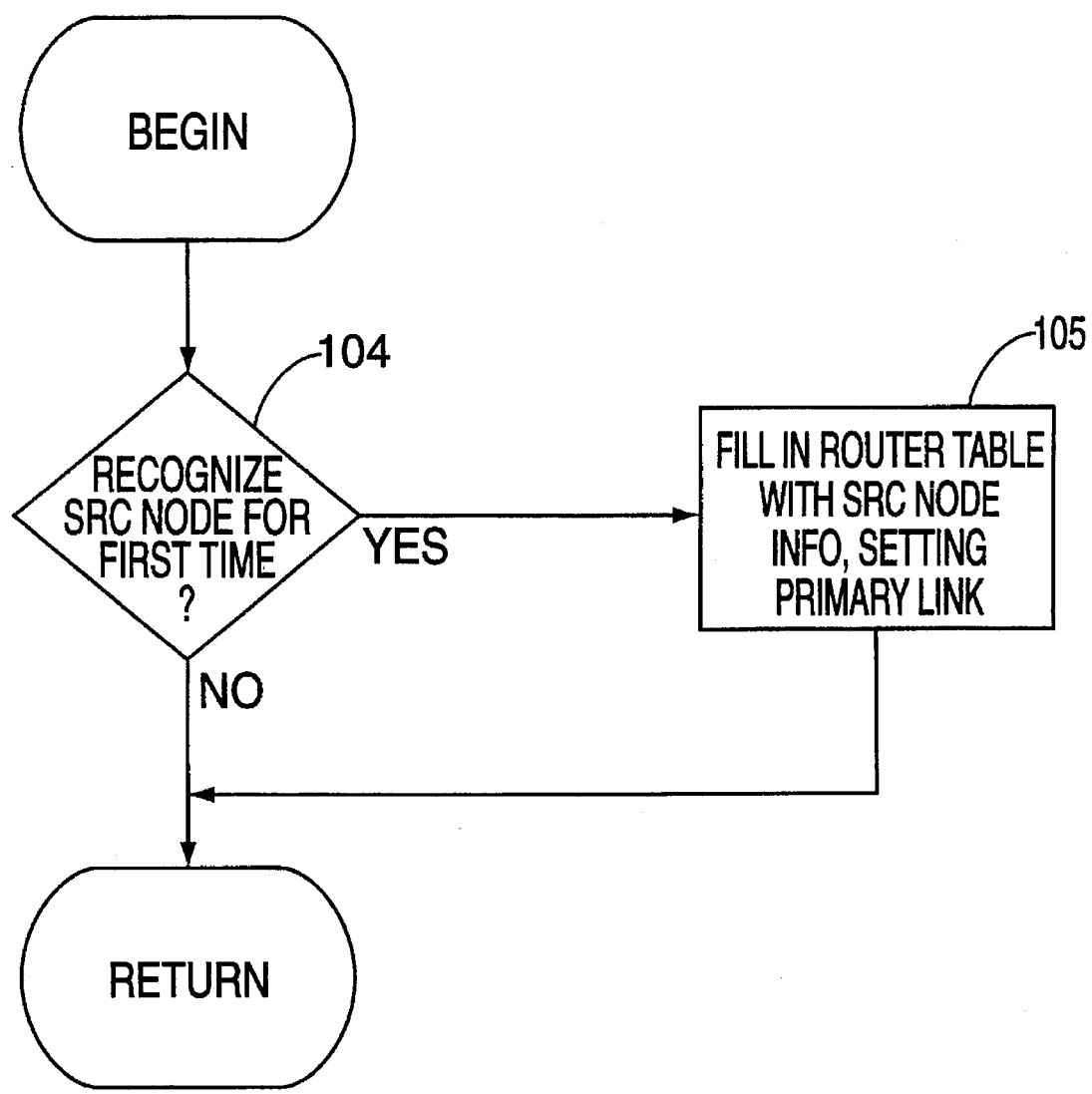
FIG. 4 is a flow chart detailing step 101 of FIG. 3.

FIG. 3 is a flow chart detailing the routing algorithm, which is used by the car controller when receiving datagrams from other nodes. The serial communications control hardware in each car controller is programmed to accept only those datagrams containing the specific bit pattern corresponding to its designated physical address (or the broadcast address). When a node detects that its physical address matches the destination physical address in the datagram (contained in Field 1), the routing software determines the destination and source NODE ID's (step 100). Step 102 determines whether or not a prior datagram has been received from the source Node. As shown in FIG. 4, if the source NODE ID has not previously been recognized (step 104), as indicated by the fact that the Routing Table entries are blank, the Routing Table fills in the table entries (step 105). The "Link ID" is set to the link over which the datagram was received, i.e., link 10 or link 20.

Figure 5:
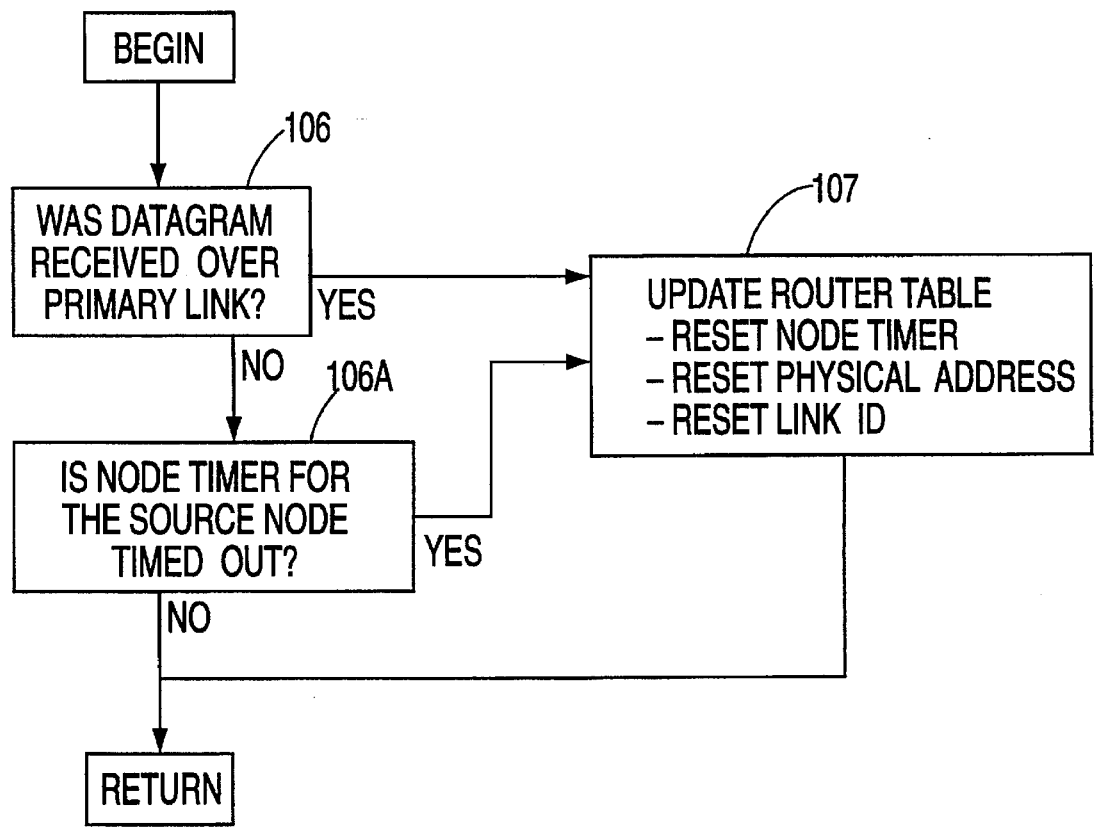
FIG. 5 is a flow chart detailing step 102 of FIG. 3.

Returning to FIG. 3, after processing newly recognized source Nodes, the router updates the Routing Table of previously recognized source Nodes, as shown in more detail in FIG. 5. The software first determines if the datagram was received over the primary link for the source Node (step 106). If so, it updates the Routing Table by resetting the Node Timer (step 107). In the preferred embodiment, the physical node address and Link ID fields of the Routing Table are also filled in, although the data has not changed. Thus, the fields will be overwritten with the same data.

If the datagram is not received over the primary link for the source Node, the router determines if the Node Timer for the source Node has expired (step 106A). If the Node Timer has expired, which indicates a potential break in the primary link, the router resets the primary link in the Routing Table to the link over which the datagram was received, resets the physical address to the physical address of the source node (which is contained in Field 1 of the datagram), and resets the Node Timer (Step 107). The physical node address and Link ID will have different values due to switching links (the physical address changes because, although the datagram may still be originating from the same Car, e.g., Car A, I/O ports A1 and A2 of Car A have different physical addresses).

Preferably, the Node Timer is not allowed to decrement all the way to zero. Instead, a lower threshold is set as expiration, below which a datagram received over a non-primary link will cause the non-primary link to become the primary link.

The primary link thus remains locked in as long as datagrams continue to be received on that link, and thrashing of the Routing Table for a node from one link to another does not occur. If datagrams are not received for a predetermined period of time on the primary link, e.g., link 10, indicating a possible communications failure on the primary link, but datagrams are subsequently received over a different communications link 20, the Routing Table switches the primary link of the source Node from link 10 to 20. In this manner, the primary link used to send datagrams to a given node is independently determined by each node in the network.

Figure 6:
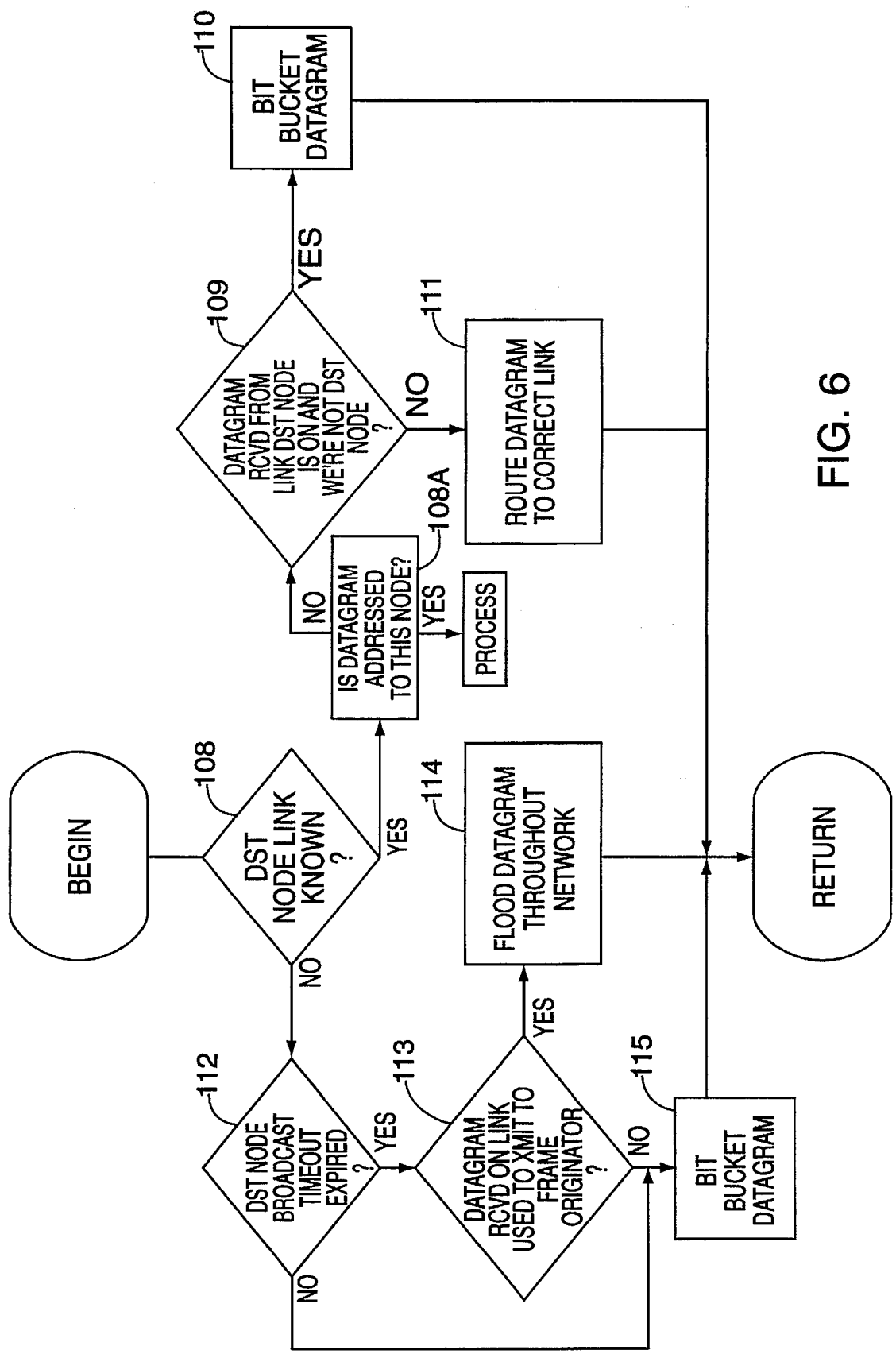
FIG. 6 is a flow chart detailing step 103 of FIG. 3.

Referring again to FIG. 3, once the housekeeping steps have been completed, the controller processes the received datagram as shown in more detail in FIG. 6. In step 108, the receiving node determines whether or not the destination node link is known (Step 108). If the Routing Table contains a Link ID for the destination Node, as will normally be the case, the controller then determines whether it is the destination node (Step 108A). In normal operation the datagram will be sent directly to the destination Node. However, if breaks occur in the communications links, the receiving node may receive datagrams intended for another destination Node (either because the datagram has been flooded onto the network or, as discussed further on, the receiving node is acting as a router to another node).

If the receiving node is not the final destination, the controller determines (step 109) whether the datagram was received over the same communications link as the destination Node primary link contained in the Routing Table. If so (which means that the controller would normally send messages to the destination Node on the same link the datagram is already on), the router assumes that the message has been passed on directly to the destination Node and simply disregards the datagram (step 110).

If however, the datagram is received over a link different from the normal communications link between the receiving Node and the destination Node, the controller re-routes the message onto the destination Node link (step 111). For example, if Car B receives a datagram on link 20 intended for Car D, and Car B's Routing Table indicates that it normally communicates with Car D over link 10, not link 20, it will re-route the datagram onto link 10. Car B's controller will update Data Field 1 in the datagram to indicate that it is being transmitted from Car B's (e.g., serial port 1B) physical address, and to specify the appropriate destination physical address (e.g. port 1D) for Car D. If the message is received on link 10, however, Car B would simply ignore the datagram.

Returning to step 108, the Routing Table will not contain a Link entry for the destination Node if it has not previously received any datagrams from the destination Node, or if the Node Timer for the destination node has completely run down to zero (which means that, after it fell below the threshold, datagrams were not received on the other link, which cause it to switch links and reset the Node Timer (steps 106, 106A, 107)). If this condition is present, the controller sends the datagram out over all links (step 114), except the link over which the datagram was received, a concept called "flooding". In the case of the exemplary embodiment, containing only two communication links, a message received on link 20 would be routed to link 10 and vice-versa.

Prior to doing so, however, the controller determines whether the datagram was received on the link normally used to communicate with the source Node (step 113). If the datagram came in on the primary communication link, the router will proceed to step 114 and route the datagram to the other link (or links). However, if the message was received over a link other than the primary communications link with the source, indicating that either the source Node or some other Node has already flooded the links with the datagram, the router ignores the datagram (step 115).

Since there can be multiple routes for a datagram to reach its destination, it is possible for a single datagram to be routed forever and never reach the destination Node. As shown in FIG. 6, this is handled by including a route count or packet life timer. In the preferred embodiment of the present invention, a flooding timer (step 112) controls the rate at which datagrams are re-broadcast to a given node. Each node in the network has its own flooding timer for other nodes in the network, which is not part of the Routing Table. This timer is an 8-bit counter which is decremented at a known rate.

In Step 112, if the countdown timer value is zero, the program sets the timer at a predetermined value, turns it on, and proceeds to step 113. If the timer is not zero, the datagram is discarded (Step 115). This means that once a datagram intended for a given destination node is flooded once onto the network, it cannot be flooded again until the timer expires, which prevents flooding from saturating all links without having to add an additional field to the datagram header.

Step 113 checks to see if the datagram has been received on the primary link to the originating node. If yes, the datagram is flooded (Step 114). If the datagram does not come in on the primary link the program assumes that the datagram has already been flooded, and discards it (Step 115). In this manner, a datagram is retransmitted on each link throughout the network only once.

Thus, Step 112 serves to allow datagrams to be flooded onto the network only on a periodic basis. Once a datagram is flooded, Step 113 serves to limit the retransmission of the flooded datagram by other nodes, and thus prevent the exponential growth of datagrams that would otherwise occur with each node flooding the newly received datagram onto other links. This is desirable because a flooded datagram uses the broadcast physical address, which causes all nodes on the link to accept the datagram. Thus, it is desirable to avoid flooding the network with datagrams of this type except when necessary, to avoid congestion.

The operation of the system will now be described relative to two examples.

EXAMPLE 1

Figure 7:
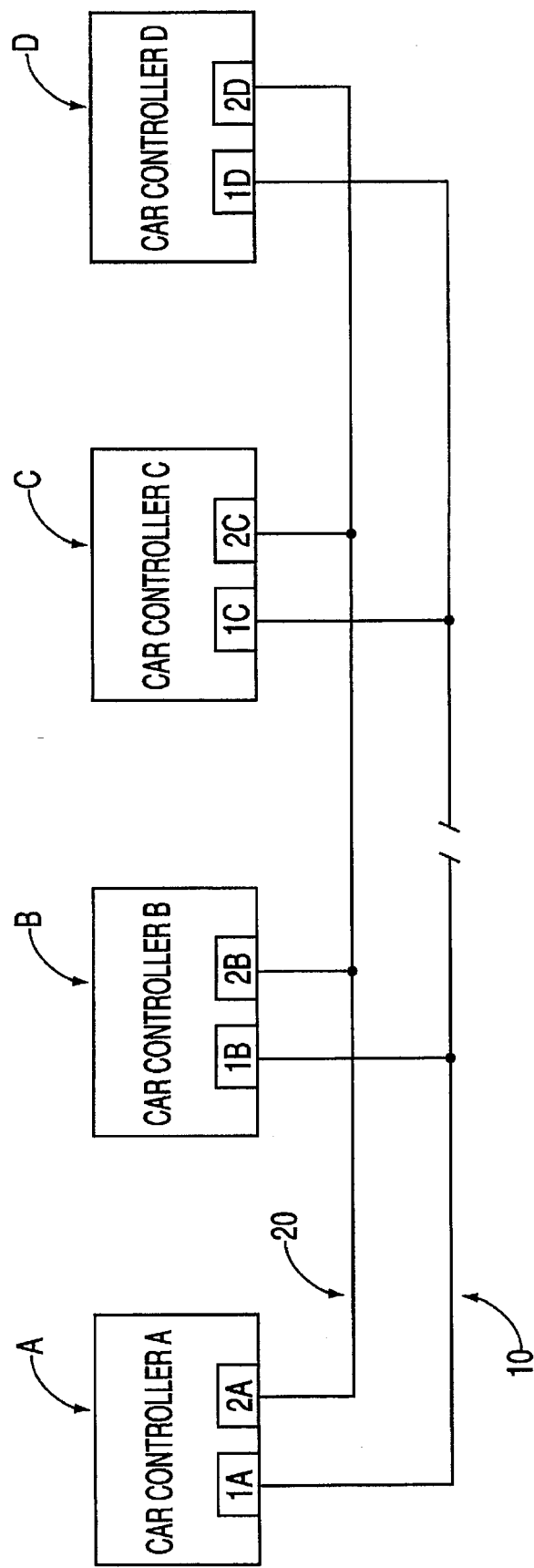
FIG. 7 is a block diagram of the FIG. 1 system, showing a first communications break.

Referring to FIG. 7, it is assumed that the system contains four (4) cars, with controller A running group operations. The group controller function in controller A would thus send a datagram to Car B, C, or D whenever it wanted to assign a hall call to a given car. Each controller B–D would send datagrams to Car A indicating car position and availability for accepting hall calls. Cars B–D will also periodically send datagrams to each other.

It will also be assumed that, prior to the break in the communications link 10 shown in FIG. 7, the system had stabilized with controller A communicating with cars B, C, and D over link 10. Cars A–D would thus have had Routing Tables in which the Link ID and physical addresses were as follows:

| Node | Link ID | Physical address |
|------|---------|------------------|
| A    | L10     | 1A               |
| B    | L10     | 2A               |
| C    | L10     | 3A               |
| D    | L10     | 4A               |

A datagram transmitted by any node, e.g., Car A, will be received only at the designated physical address, unless the physical address represents the broadcast address (in which case the datagram will be received by all other nodes). Each time that Car A transmits a datagram over link 10, the receiving node (which may or may not be the final destination node) will reset its Node Timer for Car A (step 107). The primary link to Car A will remain L10, and the physical address will remain "1A". The same will be true when the other cars in the group send datagrams to Car A.

If a break occurs in line 10 between cars B and C, as shown in FIG. 7, the controller A could continue normal communications with Car B over link 10, but could no longer communicate with controllers C and D over link 10.

As a result of the fact that controllers A and B are no longer receiving datagrams from Cars C and D, the Node Timers in Car A's and Car B's Routing Tables for Cars C and D will begin to run down and eventually reach the threshold. Similarly, the Node Timers in Car C's and Car D's Routing Tables for cars A and B will begin to run down and reach the threshold too.

Eventually, Car A's Node Timers for Cars C and D will reach zero. When Car A subsequently prepares to send another datagram for, e.g., Car C, the Car A router will detect that the Node timer value for Car C has expired, and flood the network. Thus, Controller A will transmit further datagrams intended for Car C over both links 10 and 20, and rather than specifying Car C's input 1C as the physical address, will specify the broadcast address, such that the datagram will be received by any node (car) still connected to either link.

Car C will thus receive the flooded datagram from Car A. Because the datagram arrived on link 20, which is not the primary link (Step 106), and assuming Car C's Node Timer for Node A has fallen below threshold (Step 106A), it will update its Routing Table to reset the primary link to Node A as link 20. Also, because the datagram indicates that the datagram originated from physical address 2A, not 1A, Car C will update its Routing Table to specify address "2A", rather than "1A", as the physical address for Car A (step 107).

In the same manner, when Car D receives datagrams from Car A over link 20, it will reset its Routing Table to name link 20 as the primary link to Car A and change the physical address to "2A". Thereafter, when Cars C and D transmit datagrams addressed to Car A, they will do so over link 20, not link 10, and address them to port 2A rather than 1A.

Because Cars C and D are no longer sending datagrams over link 10, Cars A and B, once the Node Timers for Cars C and D expire, will reset their Routing Tables to designate link 20 as the primary link to cars C and D (steps 106, 106A, 106B, 107) and reset the physical addresses to "2C" and "2D" respectively.

Car B will continue to transmit datagrams to, and receive datagrams from, Car A over link 10. Thus, Car B's Node Timer for Car A, and Car A's Node Timer for Car B, will continue to be reset (step 107) and will not expire. Car B will thus not change the link ID or physical address designations for Car A, as indicated by steps 106 and 106A in FIG. 5. Similarly, Car A will maintain the same primary link with Car B.

Also, because Cars C and D can continue to exchange datagrams over link 10, Car C's Node Timer for Car D will not expire, and vice-versa. Thus, the link ID and physical addresses in Car C and Car D's Routing Tables for the other car will remain the same.

Thus, the system will reach the following steady state condition ("PA" represents the physical address):

| Car A | | | Car B | | | Car C | | | Car D | | |
|------|------|----|------|------|----|------|------|----|------|------|----|
| Node | Link ID | PA | Node | Link ID | PA | Node | Link ID | PA | Node | Link ID | PA |
| A    | —    |    | A    | L10  | 1A | A    | L20  | 2A | A    | L20  | 2A |
| B    | L10  | 1B | B    | —    |    | B    | L20  | 2B | B    | L20  | 2B |
| C    | L20  | 2C | C    | L20  | 2C | C    | —    |    | C    | L10  | 1C |
| D    | L20  | 2D | D    | L20  | 2D | D    | L10  | 1D | D    | —    |    |

EXAMPLE 2

Figure 8:
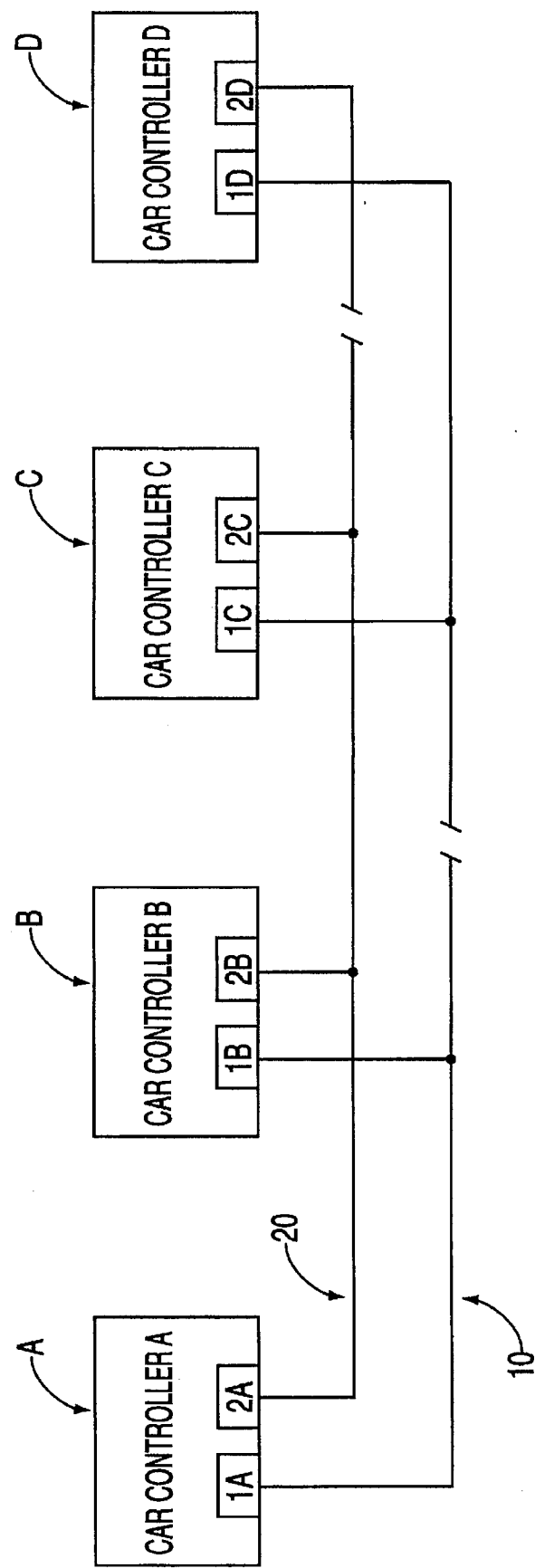
FIG. 8 is a block diagram of the FIG. 7 system, after a second communications break has occurred.

FIG. 8 assumes that a second communications break occurs, this time in link 20, between cars C and D. Car A would continue normal communications with cars B and C, but Car A's node timer for Car D would eventually time out. At such time, controller A would begin flooding the network with datagrams for Car D in an attempt to locate a new path to Car D (step 114). Car A does this by transmitting datagrams for Car D onto both links 10 and 20 and by specifying the broadcast address in the datagram destination physical address field (so that the datagram will be received by all nodes still connected to the link).

When Car C receives the flooded datagrams from Car A on link 20, it will recognize that they are intended for Car D (step 108A), and that they were not received on Car C's primary link to Car D (step 109). Therefore, Car C will re-broadcast the datagrams onto link 10 (step 111). These datagrams from Car C (which identify Car C's port 1C as the transmitting physical address) would be received by Car D on link 10.

Assuming that Car D's Node Timer for Car A has fallen below threshold, when Car D receives the datagram originating from Car A, it will recognize that datagrams from Car A are arriving from Car C on link 10. Car D will update its Routing Table to change the link ID for Car A to link 10, and to change the physical address to input 1C.

When Car D thereafter prepares datagrams intended for Car A, the datagram will specify Car A as the destination node, Car C's port 1C as the physical address, and link 10 as the primary link. The datagram will be received by Car C, who will determine that it is intended for Car A (Step 108A), and that it was received on a link (link 10) which is different that Car C's primary link to Car A (link 20) (step 109). Car C will therefore change the destination physical address field of the datagram based on Car C's Routing Table to the physical address specified for Car A (2A), change the transmitting physical location field in the datagram to specify port 2C, and then rebroadcast the datagram on link 20.

Car A would then receive the datagram, and recognize that it was received from Car C over link 20. Car A will then update its Routing Table for Car D to specify Car C (input 2C) as the physical address and link 20 as the primary link. As a result, when Car A generates future datagrams intended for Car D, they will be sent to Car C, which will rebroadcast them (Steps 108A, 109, 111) to Car D over link 10. Car C thus becomes a router for datagrams between Cars A and D.

In the foregoing example, it was assumed that Car A began flooding datagrams for Car D before Car D's Node Timer for Car A had completely run down (in which case Car D would have started to flood the network with datagrams for Car A). However, it is possible that Car D could have flooded first, or that both Cars A and D could have flooded simultaneously. Irrespective, however, of which timer expires first, in accordance with the invention eventually datagrams from Car A will reach Car D, and vice-versa, and that each car will recognize that such datagrams are being routed through Car C and update its Routing Table accordingly.

In a similar manner, Cars B and D will revise their Routing Tables to reflect that datagrams exchanged between Cars B and D need to be routed through Car C.

Thus, the system will reach the following steady state condition for FIG. 8:

| Car A | | | Car B | | | Car C | | | Car D | | |
|---|---|---|---|---|---|---|---|---|---|---|---|
| Node | Link ID | PA | Node | Link ID | PA | Node | Link ID | PA | Node | Link ID | PA |
| A | — | | A | L10 | 1A | A | L20 | 2A | A | L10 | 1C |
| B | L10 | 1B | B | — | | B | L20 | 2B | B | L10 | 1C |
| C | L20 | 2C | C | L20 | 2C | C | — | | C | L10 | 1C |
| D | L20 | 2C | D | L20 | 2C | D | L10 | 1D | D | — | |

This steady state condition differs from Example 1 in that, in Example 1, Car A sent datagrams directly to Car D on link 20 using Car D's physical destination address. Here, Car A uses Car C's physical destination address instead for datagrams destined for Car D. Upon receipt of these datagrams (step 108), Car C routes them onto link 10 (steps 109, 111) after changing the physical destination address of the datagram to that for Car D. In a similar fashion, Car C routes datagrams received on link 10 from Car D and destined for Car A onto link 20. Car C therefore serves as a switch to route frames between links 10 and 20.

Until a steady state condition is reached, and while flooding is being done to locate a new path for the datagrams, each datagram uses the broadcast physical destination address, meaning that all nodes on a given link capable of receiving datagrams accept each datagram. After steady state condition is reached, specific destination addresses are again used.

Thus, in accordance with the invention, as long as any path remains between Cars A and D, Cars A, B, C, and D will each act to restore a communications link between all the cars, even in the event of a multiple break.

The foregoing represents a description of preferred embodiments of the invention. Variations and modifications will be evident to persons skilled in the art, without departing from the inventive principles disclosed herein. For example, although the serial ports 1A, 2A etc. are given separate physical addresses, it is possible that both ports of a given node have the same physical address, and that such physical address is the same as the NODE ID. Also, while the invention has been described with reference to two multi-drop links, additional links can be employed. All such modifications and variations are intended to be within the scope of the invention, as defined in the following claims.

We claim:

1. An elevator system comprising:
   a plurality of cars, each having a car controller including means for receiving and transmitting datagrams, said datagrams indicating a specified final destination;
   a group controller means for controlling group operation of said plurality of cars;
   first and second multidrop communication links, each link being connected with said plurality of cars such that, absent communication breaks, a datagram transmitted by any car controller onto either link may be received by all the remaining car controllers; and
   wherein each car controller includes means for designating a primary link for each of the remaining cars; and means for rebroadcasting datagrams intended for another car on said primary link only when the datagram is received on a link other than said primary link.

2. An elevator system according to claim 1, wherein each car includes means for creating datagrams intended for another car or said group controller and for transmitting said datagrams, in normal operations, over only said primary link.

3. An elevator system according to claim 2, wherein each controller includes a means to determine when communications with another car over the primary link has been disrupted, and to switch the designation of primary link responsive thereto.

4. An elevator system according to claim 3, wherein said datagrams include an identification of the car originating the datagram, and wherein the means for determining communications disruption includes a timer means, in each controller, associated with each car, and wherein each controller includes means for updating the timer means associated with a specified car responsive to receiving a datagram originating from such car, and means for changing the designation of the primary link for such car, after such timer has expired and responsive to receiving a datagram from such car over a link other than the existing primary link, from the currently designated primary link to said other link.

5. An elevator system according to claim 4, wherein each car is assigned at least one physical address; wherein each datagram includes a destination physical address, representing the car to which to which the datagram will be routed, and a transmitting physical address, representing the car that transmitted such datagram; wherein each car includes means to accept only datagrams specifying one or more predetermined destination physical addresses; wherein each car stores a primary physical address for each of the other cars; and wherein each car has means to change the primary physical address associated with a given other car responsive to receiving a datagram originating from said other car from a physical address other than the primary physical address for such other car.

6. An elevator system according to claim 5, wherein each controller further comprises means, in response to receiving a datagram intended for another final destination, which datagram is received over a link other than the destination car primary link, for changing said datagram to specify the destination physical address associated with said final destination and to specify itself as the transmitting physical address, and to rebroadcast such datagram over the destination car primary link.

7. An elevator system according to claim 6, wherein each controller has means for generating datagrams intended for another car specifying the physical address associated with said final destination, wherein each controller has means, responsive to sensing an interruption with said destination car, for specifying a broadcast physical address and for transmitting said datagram over all links, and wherein each of said cars has means for accepting datagrams containing said broadcast address.

8. An elevator system according to claim 7, wherein a plurality of said car controllers each have a group controller means for controlling group operation of said plurality of cars.

\* \* \* \* \*